June 12, 1956     N. R. HASTINGS     2,749,750

ANEMOMETER

Filed March 9, 1953

INVENTOR
N. R. HASTINGS

BY *A. Yates Dowell*
ATTORNEY

United States Patent Office 2,749,750
Patented June 12, 1956

2,749,750

ANEMOMETER

Norman R. Hastings, Huron, S. Dak., assignor to Walk Time, Inc., Huron, S. Dak., a corporation of South Dakota Application March 9, 1953, Serial No. 341,253

13 Claims. (Cl. 73—189)

This invention relates to wind velocity measuring and more particularly to an improved anemometer adapted to give instantaneous readings over a wide range. Anemometers have been in use for many years, but these have oftentimes been subject to various deficiencies such as being usable only through a relatively limited velocity range or not giving accurate readings when subjected to gusty or varying wind velocities.

Accordingly, it is an object of the present invention to provide an anemometer which is accurate over a wide range of velocities.

A further object is the provision of an anemometer which may be used in gusty or shifting winds.

A further object is the provision of an anemometer which is inexpensive to manufacture and simple and sturdy in construction.

Figure 1:
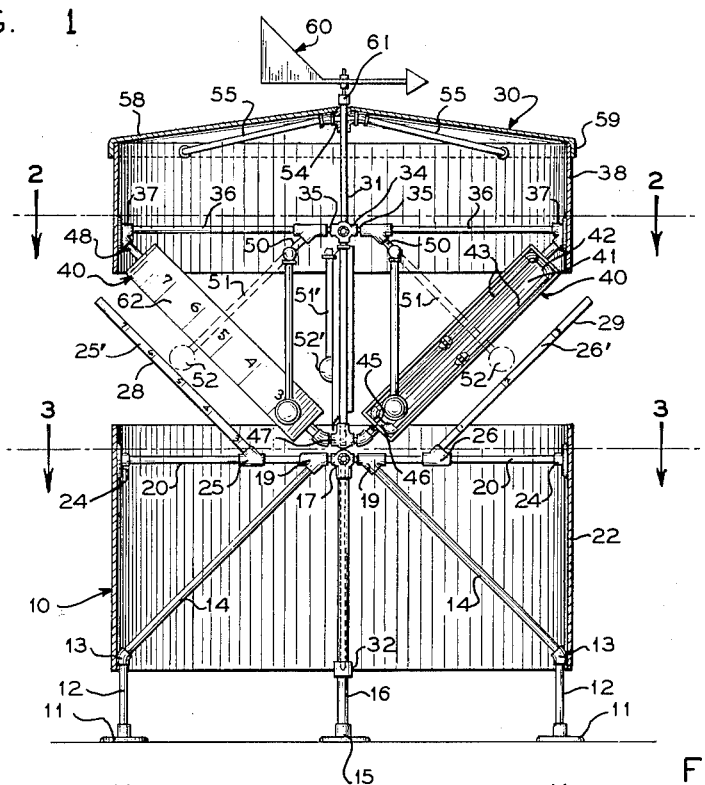
Figures 2, 3:
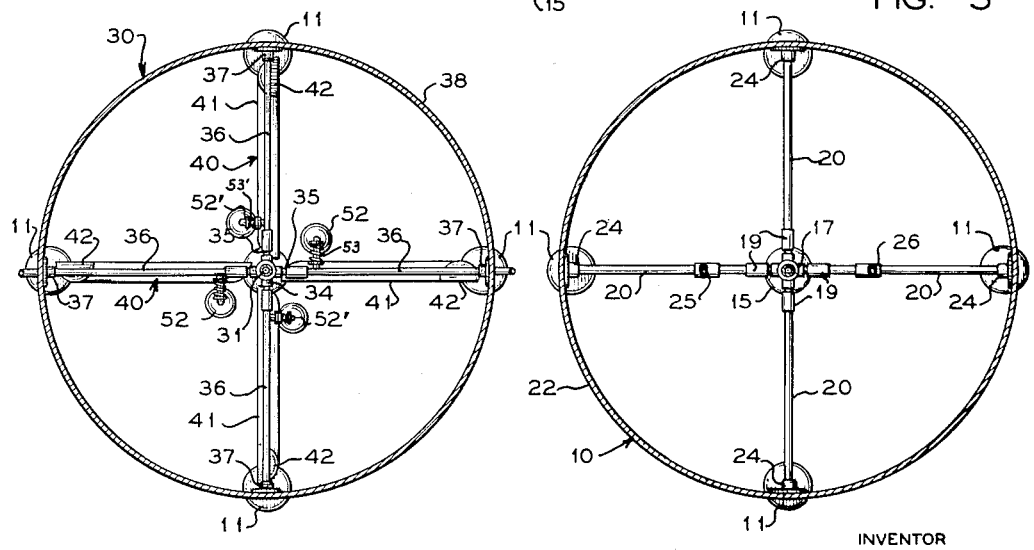

These and other objects of the invention will become apparent from the following description, in conjunction with the accompanying drawing, in which:

Fig. 1 is a vertical section through an anemometer constructed in accordance with the present invention;

Fig. 2 a section on the line 2—2 of Fig. 1; and

Fig. 3 a section of the line 3—3 of Fig. 1.

Briefly stated the anemometer of the present invention comprises a base, including a vertical sleeve, the sleeve having a thrust bearing near its lower portion which supports the lower end of a shaft. The shaft at its upper portion has a plurality of oppositely disposed radial spokes. A wind trough is attached to the end of each spoke, and extends toward the portion of the shaft just above the sleeve, the shaft forming a triangle with each spoke and its respective trough. An off-set arm carrying a sphere or weight at its end is pivotally attached to each of the spokes near the shaft. As the wind troughs revolve the rotatable assembly including the shaft, and the spokes, the arms swing outwardly in proportion to the speed of rotation of the device. Two or more pairs of oppositely disposed arms may be used, the movement of each pair being opposed by a different resistance means attached to it and a scale being provided to indicate the velocity of the wind in accordance with the angularity of the particular pair of arms.

Referring to the drawing, the device includes a base 10 having a plurality of spaced sockets 11. Those shown are four in number and are arranged in a circle although other supporting means may be employed. Extending up from each socket 11 is a bar or foot 12 which is connected by an elbow 13 to a longer bar or leg member 14. The leg member 14 is inclined upwardly and inwardly toward the axis of the base sockets 11.

A socket 15 is positioned centrally of the sockets 11 and supports a vertical sleeve 16 having a four-way joint 17 at its upper end.

Each of the upper ends of the leg members 14 is received in a T fitting 19. A lateral bar or rod 20 passes through the upper horizontal portion of the fitting 19 and has its inner end received in the four-way fitting 17.

A cylinder 22 extends from just below the elbows 13 to just above the rods 20 and is attached to the rods 20 by sockets 24, the cylinder providing a housing for the lower portion of the device.

T fittings 25 and 26 are attached to oppositely disposed rods 20 intermediate the ends thereof, and support angularly disposed scale members 25' and 26' carrying scale markings 28 and 29, the scale marking on each scale member being provided for a movable member later to be described.

The portion of the device previously described in detail is stationary. The remainder is supported on the base and adapted to rotate upon receiving an impulse from the wind.

The upper portion of the device comprises a wind turbine 30 supported in the sleeve 16 of the base by a shaft 31 which is rotatably carried by a thrust bearing 32 near the lower end of the sleeve. Shaft 31 extends substantially above the sleeve in order to support the various elements of the turbine, but due to its being received for a substantial portion of its length in the sleeve, is stable against tipping.

Spaced substantially from the sleeve and near the upper portion of the shaft is a fitting 34 which has a plurality of oppositely disposed pairs of connectors 35 extending radially therefrom and from the shaft. Attached to each of the connectors is a bar or spoke 36 which is received at its other end in an elbow fitting 37.

A second cylinder 38 surrounds and houses the upper portion of the shaft 31 and the spokes 36, and has the fittings 37 mounted on its inner wall. The cylinder 38 is of approximately the same diameter but not as long as cylinder 22, in the particular embodiment shown.

From the other connection of the elbows 37 a wind trough 40 is attached which extends angularly inwardly toward the shaft 31, the shaft being attached in triangular relationship with each spoke 36 and its corresponding trough 40.

The troughs each comprise a semi-cylindrical elongated sheet member 41 having semi-circular end members 42. In order to maintain the troughs in the desired relationship, a frame is provided comprising a pair of parallel rods 43 running along each interior side of the trough and connected at their ends by webs 45. A strut 46 extends from the lower web 45 to fitting 47 attached to the shaft 31 just above the fitting 17, and a strut 48 extends from the upper web 45 to the other joint of the elbow fitting 37 at which the spoke 36 is connected.

Adjacent to the fitting 35 each spoke 36 has a T fitting mounted on it which carries a short offset rod 50, which extends downwardly and out of the plane formed by the shaft 31 and each of the connected spokes and troughs. Pivotally attached to the end of the bars 50 are arms 51, 51' having spheres or weights 52, 52' at their other ends. The arms of pair 51 are preferably the same length and oppositely disposed. Similarly the arms of pair 51' and any other pairs are oppositely disposed. In order to provide accurate velocity readings through a wide range, however, torsion springs 53, 53' are attached to the arms 51, 51', respectively, the springs of pair 51 affording less resistance than those of pair 51'. Pair 51, therefore, registers on scale 28, and pair 51' on scale 26'. Arms 51, therefore, constitute an oppositely disposed pair, as do arms 51'. The two pairs, however, are attached transversely to each other in order to secure substantial equilibrium of the device, although a greater number of pairs may be employed if desired. In this event the angular spacing between adjacent pairs would preferably be equalized.

Near the upper extremity of the shaft 31 a fitting 54 is connected from which a plurality of struts 55 extend and are connected to the walls of the cylinder 38. The number of such struts 55 employed depends on the rigidity and dimensions of the cylinder 38. A sufficient number of struts is used to maintain the cylinder 38 substantially cylindrical when exposed to maximum winds.

A frusto-conical cover 58 is mounted over the upper end of the cylinder 38 and connected thereto by flange 59.

A vane 60 is mounted on a shaft 61 which is rotatably supported on shaft 31 and indicates the direction of the wind.

Scale markings 62 are applied to the backs of the troughs 41 corresponding to the readings from the adjacent arm.

It will be recognized that cylinders 22 and 38 not only afford protection to the portions of the device which they house, but also afford smoother air flow past the device in order to reduce inaccuracies due to turbulence caused by the wind passing through the device.

In the operation of the anemometer the wind troughs, which are all faced in the same direction of rotation and transversely to the spokes, receive the wind and tend to produce rotation of the shaft 31 and the elements connected thereto. Upon rotation of the shaft, the arms 51 and 51' carrying the weights 52, 52', respectively, tend to swing outwardly due to centrifugal force. The angular position assumed by the arms is proportional to the force thus exerted and provides an indication of the velocity of the wind. The readings for an arm, or a pair of arms 51, may be made on the backs of the troughs to which the arms is adjacent or on the corresponding scale 25'. Similarly, the velocity reading for the arms 51' carrying the weights 52' may be read on the backs of their respective troughs or in the stationary scale 26'.

It will be understood, therefore, that the invention includes a substantially mounted base carrying a vertical sleeve, a shaft being mounted in the sleeve and carrying a plurality of spokes to which angularly disposed wind troughs are attached, each spoke carrying also a pivotally mounted weighted arm which assumes an angular position proportionate to the speed with which the troughs rotate the shaft.

Although a particular form of wind trough has been described, the invention is not limited to this specific form but includes the use of more conventional means for producing rotation of a shaft by the wind in accordance with its speed.

It will be apparent to those skilled in the art that the invention is not restricted to the particular embodiment shown and described but that reasonable variations and modifications thereof are within its scope and therefore the invention is only limited as described in the following claims.

What is claimed is:

1. An anemometer comprising a base, said base comprising spaced sockets arranged in a circle, a foot received in and upstanding from each socket, a leg connected to each foot and inclined inwardly and upwardly toward the axis of the circle, a central socket positioned at the central portion of the circle, said sockets resting on a surface, a sleeve upstanding vertically from the central socket, said sleeve having its upper end in proximity to the upper ends of the legs, a lateral rod extending radially from the upper end of each leg and substantially co-planar therewith, joints connecting each rod to its respective leg, joint means connecting the lateral rods together substantially around the upper end of the sleeve, a first cylinder having its lower end around the feet and its upper end around the lateral rods, said rods being connected to said cylinder, a first wind velocity indicator attached to one of said rods, and a second attached to an opposite rod, each indicator comprising an elongated member having scale markings and having an end connected to its respective rod intermediate the ends thereof and being inclined upwardly and outwardly, one of said indicators having scale markings to a different scale than the other, and a wind turbine rotatably mounted on said base, said turbine comprising a vertical shaft received in said sleeve, thrust bearing means on said sleeve rotatably supporting the lower end of said shaft, said shaft extending substantially above said sleeve, a plurality of oppositely disposed pairs of radial rod members extending from said shaft at a position thereon substantially spaced from the upper end of said sleeve, a second cylinder around said rod members, the ends of said rod members being connected to said cylinder, a plurality of struts extending from the upper portion of said cylinder and connected together at the shaft, a conical top over the second cylinder, a wind direction indicator rotatably mounted on said shaft and extending upwardly therefrom and above the conical top, a first pair of rods connected to a pair of oppositely disposed rod members, a second pair of rods connected to a second pair of oppositely disposed rod members, the second pair of rod members being laterally disposed to the first pair, each of said rods being connected to its respective rod member near the shaft and extending outwardly, downwardly, and out of the plane of the rod member, an arm pivotally attached to the lower end of each rod, a weight attached to the lower end of each arm, and spring means resisting outward movement of the arms and attached thereto, the means attached to each of a pair of oppositely disposed arms being equal, one such pair having said means of different resistance from another such pair, and a wind trough extending from the end of each rod member attached to the second cylinder and connected to the shaft just above the upper end of the sleeve, said troughs each comprising a semi-cylindrical elongated sheet member having semi-circular end members, a pair of parallel rods extending the length of each sheet member, a web joining the ends of said rods, and means connecting the webs to the respective rod members and to the shaft, said troughs having their open sides facing transversely to the radial rod members and in the same direction of rotation, and scale markings on the backs of the trough members.

2. An anemometer comprising a base, said base comprising spaced peripheral supports, a central support member, a sleeve upstanding vertically from the central support member, said sleeve having its upper end in proximity to the upper ends of the spaced peripheral supports, a first cylinder around the peripheral supports, a first wind velocity indicator attached to one of said supports, and a second wind velocity indicator attached to an opposite support, each indicator comprising an elongated member having scale markings and having an end connected to its respective support and being inclined upwardly and outwardly, one of said indicators having scale markings to a different scale than the other, and a wind turbine rotatably mounted on said base, said turbine comprising a shaft received in said sleeve, means on said sleeve rotatably supporting said shaft, said shaft extending substantially above said sleeve, a plurality of oppositely disposed pairs of radial rod members extending from said shaft at a position thereon substantially spaced from the upper end of said sleeve, a second cylinder around said rod members, the ends of said rod members being connected to said cylinder, a plurality of struts extending from the upper portion of said cylinder and connected together at the shaft, a conical top over the second cylinder, a wind direction indicator rotatably mounted on said shaft and extending upwardly therefrom and above the conical top, a first pair of arms pivotally connected to a pair of oppositely disposed rod members, a second pair of arms pivotally connected to a second pair of oppositely disposed rod members, the second pair of rod members being laterally disposed to the first pair, each of said arms being connected to its respective rod member near the shaft and extending outwardly downwardly and out of the plane of the rod member, a weight attached to the lower end of each arm, means attached to the arms and resisting outward movement, one such pair of arms having such means of different magnitude from another such pair, and a wind trough extending from the end of each rod member attached to the second cylinder and connected to the shaft just above the upper end of the sleeve, said troughs having their open sides facing transversely to the radial rod members and in the same direction of rotation, and scale markings on the backs of the trough members.

3. An anemometer comprising a base, said base having a vertical sleeve, a shaft rotatably supported in said sleeve and extending substantially above its upper end, a plurality of oppositely disposed spokes extending laterally from said shaft, a housing around said spokes and connected to the outer ends thereof, a wind trough connected to the outer end of each spoke and extending downwardly and inwardly toward the shaft, means connecting the ends of the wind troughs adjacent to the shaft together, said means being mounted on the shaft, said troughs having their open sides facing transversely to the spokes and in the same direction of rotation, a plurality of arms, one for each spoke, means pivotally connecting an end of each arm to a spoke and adjacent to the shaft, said pivotal connecting means being offset from the vertical plane of the spoke, means attached to each arm and resisting outward movement thereof, the last said means for an oppositely disposed pair of arms being the same, and means connected to the base and extending substantially parallel to the troughs for indicating the inclination of the arms with respect to the vertical plane.

4. An anemometer comprising a base, a vertical shaft rotatably supported on said base, a plurality of oppositely disposed spokes extending from said shaft above said base, a wind trough having an end thereof attached to the peripheral portion of each of said spokes, the other end of the wind trough being connected to the shaft above said base, each said spoke and a trough connected thereto being arranged in triangular relationship with respect to said shaft and lying in a substantially vertical plane therewith, each of said troughs facing transversely to its respective vertical plane, said troughs facing in the same direction of rotation, an indicator arm for each trough, mounting means connecting each indicator arm to the spoke connected to the respective trough for movement toward and away from said shaft, said means being adjacent to the shaft and offset from said plane, means attached to each arm and resisting outward movement thereof, the last said means on each of a pair of oppositely disposed arms being equal, and scale means on said anemometer for cooperation with each pair of oppositely disposed arms for indicating the wind velocity.

5. An anemometer comprising a base, a vertical shaft rotatably supported on said base, a plurality of wind troughs, means supporting said wind troughs on the shaft with the open sides of the troughs facing in the same direction of rotation and responsive to the velocity of the wind, first and second wind velocity indicating means responsive to the angular velocity of said troughs each comprising an arm, means mounting said arms on said shaft for swingable movement in a vertical plane, means restraining swingable movement of said arm of said second wind velocity responsive means, first and second scales mounted adjacent to said shaft, whereby upon rotation of the shaft within a low velocity range the first arm will swing outwardly to indicate velocity on its associated scale, the second arm being restrained by said restraining means, and whereby upon rotation at a velocity above a predetermined minimum the second arm will overcome the resistance of said restraining means and swing outwardly to indicate velocity on its associated scale.

6. An anemometer comprising a base, a vertical shaft rotatably supported on said base, a plurality of wind troughs, means supporting said wind troughs on the shaft with the open sides of the troughs facing in the same direction of rotation, wind velocity indicating means responsive to the angular velocity of said troughs each comprising an arm, means mounting said arms on said shaft for swingable movement in a vertical plane, scales on said troughs and disposed in proximity to the arc of swingable movement of said velocity responsive means, whereby upon rotation of the shaft the arms will swing outwardly in proximity to the associated indicator.

7. In a wind driven anemometer having a base, a vertical shaft supported on said base and rotatable in response to wind velocity, wind driven means secured to said shaft to drive said shaft, a plurality of arms and means swingably mounting said arms on said shaft whereby at wind velocities above a predetermined maximum the arms will extend substantially perpendicularly to the shaft, the improvement comprising a housing positioned above the arms, the mounting means being positioned between the walls of the housing, whereby rotation of the shaft at excessive speed will cause said swingably mounted arms to rotate to a position in which they are substantially entirely positioned between the walls of the housing thereby shielding them from wind of excessive velocity.

8. A fluid speed measuring anemometer comprising a support, a rotatable element rotatably mounted on said support and having a plurality of wind receiving vanes whereby the passage of fluid past said rotatable element will cause said rotatable element to rotate in accordance with the speed of movement of the fluid, a first set of radially movable weights mounted on said rotatable element and arranged in equal circumferential arrangement so that the weights will be maintained in correct dynamic balance upon rotation, means to oppose the outward radial movement of the weights so that the speed of rotation will be indicated by the position of the weights during rotation, a scale cooperating with said first set of weights to indicate the speed of rotation over a predetermined range, a second set of radially movable weights mounted on said rotatable element and having means of greater force opposing the radial movement so that the second series of weights will be effective over a higher fluid speed, a second scale for cooperation with said second set of weights to indicate the speed over a different range from that indicated by the first set of weights.

9. The invention according to claim 8 in which a canopy is provided above said wind receiving vanes.

10. The invention according to claim 9 in which a wind direction vane is pivotally mounted above said canopy.

11. An anemometer comprising a support, a rotatable element rotatably mounted on said support for rotation about a vertical axis and having a plurality of wind engaging vanes for causing rotation of said rotatable element, a set of radially movable weights mounted on said rotatable element and movable from a position close to the axis of said rotatable element to a position spaced therefrom, said weights being spaced apart by substantially the same angle to maintain the rotatable element and weights in balance, and scale means directly cooperable with said weights to indicate the speed of movement of a fluid past said anemometer.

12. An anemometer comprising a support, an element having a plurality of wind engaging vanes mounted on said support for rotation about a vertical axis, a plurality of arms pivotally connected to said element closely adjacent the axis thereof for arcuate swinging movement in equiangularly radially disposed planes from the axis of rotation of said element, weights mounted on the free ends of the swingable arms, said weights being spaced apart by substantially the same angle to maintain the rotatable balance, and scale means directly cooperable with said weights to indicate the speed of movement of a fluid past the anemometer.

13. The invention according to claim 12, in which a housing surrounds said rotatable element at the elevation of the pivotal connection of said arms, such housing being of a horizontal dimension sufficient to receive the arms and the weights thereon when such arms and weights extend approximately radially and horizontally from the axis of said rotatable element whereby excessive wind velocities will not damage the anemometer.

References Cited in the file of this patent

UNITED STATES PATENTS

| | | |
|---|---|---|
| 2,270,120 | Greene | Jan. 13, 1942 |
| 2,390,384 | Poole | Dec. 4, 1945 |
| 2,561,700 | Hughes | July 24, 1951 |
| 2,612,043 | Chisholm | Sept. 30, 1952 |

FOREIGN PATENTS

| | | |
|---|---|---|
| 515,396 | France | Nov. 25, 1920 |